United States Patent [19]

Yang et al.

[11] Patent Number: 4,749,260
[45] Date of Patent: * Jun. 7, 1988

[54] VARIABLE COLOR TRANSPARENT PANELS

[75] Inventors: Sze C. Yang, Kingston; Richard R. Durand, Jr., Narragansett, both of R.I.

[73] Assignee: The Board of Governors for Higher Education, State of Rhode Island and Providence Plantations, Providence, R.I.

[*] Notice: The portion of the term of this patent subsequent to May 6, 2003 has been disclaimed.

[21] Appl. No.: 858,384

[22] Filed: May 1, 1986

Related U.S. Application Data

[63] Continuation-in-part of Ser. No. 646,232, Aug. 31, 1984, Pat. No. 4,586,792.

[51] Int. Cl.$^4$ .............................................. G02F 1/01
[52] U.S. Cl. .................................................... 350/357
[58] Field of Search ........................................ 350/357

[56] References Cited

U.S. PATENT DOCUMENTS

| 4,009,936 | 3/1977 | Kasai | 350/357 |
| 4,135,790 | 1/1979 | Takahashi et al. | 350/357 |
| 4,586,792 | 5/1986 | Yang et al. | 350/357 |

FOREIGN PATENT DOCUMENTS 0027240 2/1982 Japan ................................. 350/357

Primary Examiner—Eugene R. LaRoche
Assistant Examiner—James C. Lee
Attorney, Agent, or Firm—Samuels, Gauthier, Stevens and Kehoe

[57] ABSTRACT

An electronic display device having a polyaniline film coated on a transparent electrode. The film has electrochromic properties and will display at least three distinct reproducible color changes.

13 Claims, 1 Drawing Sheet

VARIABLE COLOR TRANSPARENT PANELS

CROSS REFERENCE TO RELATED APPLICATIONS

This application is a continuation-in-part application of Ser. No. 646,323, filed Aug. 31, 1984 now U.S. Pat. No. 4,586,792.

BACKGROUND AND BRIEF SUMMARY OF THE INVENTION

Electrochromism describes the induction of a color change in a medium as a result of charge transfer or electron transfer caused by an externally applied potential. The color changes are indications of induced chemical changes in the species of interest. For most chemical species exhibiting this effect, the change is from one color to another. As an example, viologen dye molecules change from yellow-orange to blue when reduced at a cathode. J. Bruinik, C. G. A. Kregting, and J. J. Ponjee, *J. Electrochem. Soc.* 124, 1853 (1977). Solid films of $WO_3$ also show electrochromism with transparent films becoming blue upon reduction.

In order for electrochromic materials to be useful for display purposes, they must have optical absorption in the visible spectrum and exhibit mixed conduction capability (i.e. electronic and ionic). It is also highly desirable to exhibit high contrast from the background in order to modulate ambient light. Electrochromic materials generally have these properties. Electrochromic materials are usually operated with low voltages and can provide suitable contrasts with charge transfer of only several millicoulombs of electrical charge per square centimeter of display area. Erasure is easily made by polarity changes. These materials may also have the ability to hold images for the required response time of the human eye (about 0.1 second) and this further may allow for the use of memory effects. A major disadvantage of electrochromic displays is the lifetime of the device. Chemical degradation frequently occurs as usage time increases.

The most studied systems which utilize the electrochromic effect are displays based on $WO_3$. B. W. Faughnan, *Topics in Applied Physics: Display Devices*, Volume 40, J. I. Pankove (ed.), Springer-Verlag, New York, (1980), p. 181. Amorphous films of $WO_3$ have high ion mobilities as necessary and exhibit coloring and bleaching between blue and transparent colors. The device lifetime is extremely sensitive to the presence of oxygen and water. To date, a commercial viable system based on the oxide films has yet to be produced.

Organic species have also been examined as an alternative but frequently lack the desired contrast since they convert between two distinct colors and do not have a transparent form. J. Bruinick, C. G. A. Kregting, and J. J. Ponjee, *J. Electrochem. Soc.* 124, 1853 (1977). M. M. Nicholson and F. A. Pizzarello, *J. Electrochem, Soc.* 127, 821 (1980).

Polyaniline is the chemical name given to the product of anodic oxidation of aniline. The formation of polymeric compounds by oxidation of aniline has been known for some time. S. Venkataraman, *Chemistry of Synthetic Dyes*, Volume II, Academic Press, New York (1952), p. 772. The products are highly colored films or solids. The first modern electrochemical study of this oxidation at solid electrodes was carried out by Adams and co-workers. D. M. Mohilner, R. N. Adams, and W. J. Argersinger, Jr., *J. Am. Chem. Soc.* 84, 3618 (1962). A polymeric product was obtained which they suggested to be an octamer of head to tail para coupling of aniline monomers.

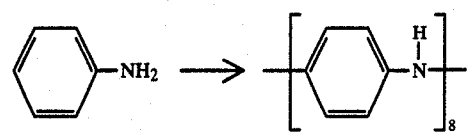

This octamer was prepared in sulfuric acid electrolyte. It has been suggested to be emeraldine sulfate, a highly colored salt which had been observed in previous studies involving chemical oxidation. Since their original paper, Adams and coworkers have acknowledged that other coupling modes (i.e. head-to-head or tail-to-tail) are possible. J. Bacon and R. N. Adams, *J. Am. Chem. Soc.* 90, 6596 (1968). Although the polymeric nature of this oxidation product has been suggested for many years, the full characterization has remained inconclusive. Renewed interest in the structural nature of the polymer has been generated by recent findings of its good electrical conductivity. A. F. Diaz and J. A. Logan, *J. Electroanal. Chem.* 111, 111 (1980). They noted that the polymer is conducting in both anodic and cathodic regions. They also noted that the film color can be altered by varying the electrode potential.

A more recent article has presented a brief spectral characterization of films grown on indium oxide electrodes. T. Kobayashi, H. Yaneyama, and H. Tamura, *J. Electroanal. Chem.* 161, 419 (1984).

Our invention is in part based on the fact that polyaniline films are conducting and although it has not been established, it is believed that there are ionic and electronic contributions to its conductive properties. It is expected that relatively high ion mobilities (particularly proton) are found for this films. The films are prepared in aqueous solution and do not dissolve. They are also relatively stable toward oxygen.

Our prior invention embodied an electronic display element useful in electronic color display devices. Broadly, that invention comprised two electrodes, at least one electrode being transparent, having electrolyte disposed therebetween. A thin film of polymeric aniline or its chemical derivatives was placed in electrical communication with at least one of said electrodes. In the preferred embodiment, the polymeric film was coated electrolytically on the anode using an acidic solution containing the monomeric aniline. After the polymer film was coated, the solution was replaced by an acidic electrolyte solution which did not contain aniline monomer. Applying different voltages across the interface between the polymer film and the electrolyte resulted in color changes of the film. Color changes achieved included blue, green, yellow and transparent. The color changes were sharp and distinct and repeated cycling of the voltage did not cause degradation of the film and the response time of the color change was short.

The display element of that invention overcomes the prior art problems of longevity and the prior art problems of the inability of the films to repeatedly produce color changes, including transparent, which are necessary for successful application of electrochromism in electronic color display devices. Further advantages of that invention were a display screen in a thin plate or rollable sheet which consumes a minimal amount of electrical power. Further, the area of the display device can be very large in reference to the physical limitations imposed on the presently available cathode-ray tubes. Most importantly, a multicolor display was achieved which capability is not available in present liquid crystal display devices.

Although our prior invention embodied and embraced the use of the color changes within two transparent surfaces, the present invention is directed more particularly to the use of the polymeric aniline between two transparent surfaces for use such as in windows, windshields, glasses, bowls, decorative panels and the like.

There are presently available 'tinted' or 'color changeable' transparent panels such as sunglasses and there are photochromic glasses which respond to light to change the color of those glasses from a first shade of the color to a second shade or tint of the color; i.e. from dark brown to light brown.

The present invention embodies a multi-color switchable panel while the prior art photochromic panels have only one color. The panel of our invention responds rapidly while the photochromic prior art glasses take minutes to change its transmittency and color. The polychromic panels of the present invention cannot only change colors and tints with rapidity but can also become completely transparent.

While it is understood that prior art glasses such as so called photosensitive sunglasses change shades a typical time to change between a light transmittency of 20% to 80% requires 120 to 180 seconds. In our invention to effect the same change in transmittency requires a time of only 0.05 to 1 seconds. Thus, our invention includes the ability to change between colors as defined previously and to change between tints or shades within a color within a very rapid time frame which is not believed achievable in the prior art and/or to change within tints and to change to transparent which is not believed achievable in the prior art.

DESCRIPTION OF THE PREFERRED EMBODIMENT

Figure 1:
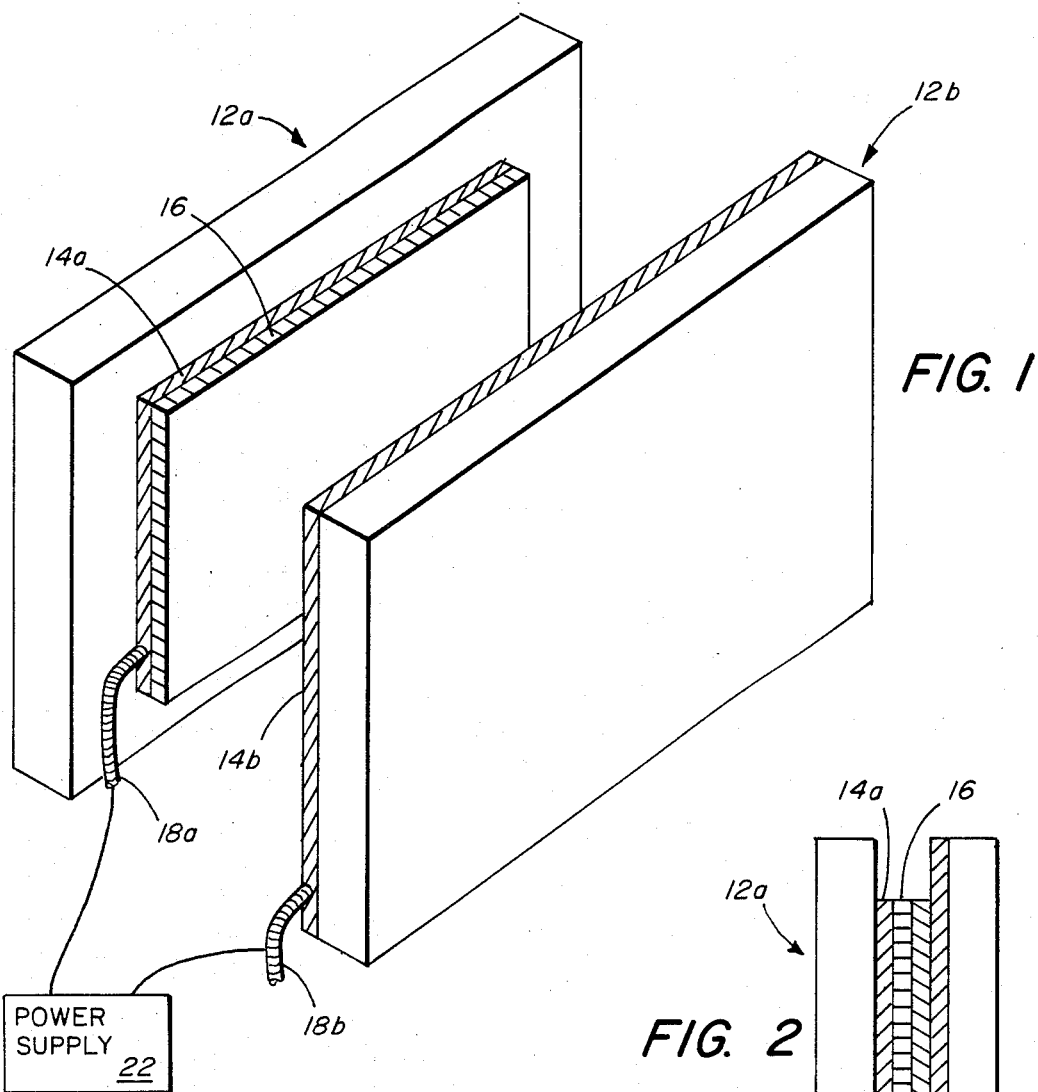
FIG. 1 is an exploded perspective view of a transparent panel embodying the invention.

Two properties of polyaniline that are unique for organic polymers, and are highly desirable for the transparent panel are: (1) the capability for multi-color switching, and (2) the capability of producing a transparent form at a reducing potential. The transparent form provides the needed high contrast in display. The properties noted here suggest that such a species is especially suitable for use in a electrochromic display device.

The origin of the unique electrochromic effect for polyaniline is most likely due to structural changes occurring in the polymer backbone upon electrochemical cycling. In the most oxidized form, these should be extensive—conjugation along the backbone producing the intense blue color. In the most reduced form, there should be little conjugation and thus the transparent color results. Schematically the two extremes can be depicted as:

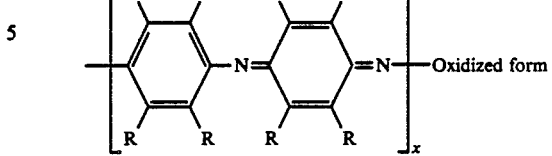Oxidized form

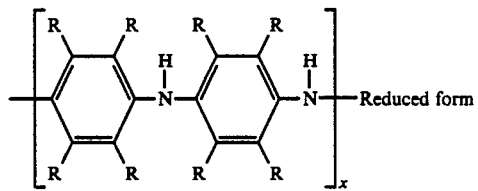Reduced form

The intermediate colors from blue-green to yellow are due to various compositions of oxidized and reduced moieties including delocalized polymer radicals and polymer cations. A polymer backbone structure containing aromatic rings linked by nitrogen atoms is favorable to the electrochromic properties because of the stability of these colored polymer radicals and anions. Polymers built from monomers with structures I, II and III (see below) all have such favorable backbone structures and they are suitable as a electrochromic display material. The nature of anions present and pH of the electrolyte also influence the color distribution since the acid-base characteristics of the polymer are important to film properties. It is also plausible that the polymer contains more than one kind of monomer unit or cross-link between chains. Both of these structural possibilities could contribute to the tunability of the film color.

The addition of substituent groups to the aromatic rings can alter the properties of the films. Electron withdrawing substituents such as nitro groups would lower the oxidation potentials, whereas electron donating groups will tend to raise these potentials. Thus, the window of accessible potentials is tuned as will the color of the films, due to changes in electronic structure. Appropriate choice of a combination of substituent grups will provide flexibility in modifying the electrochromic properties of the polymer films. By choosing a combination of substituent groups the electrochromic properties of the polymer film can be modified. These polymers can be prepared from the monomers of the structures I, II, and III where $R_1$ to $R_8$

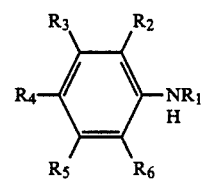

Structure I

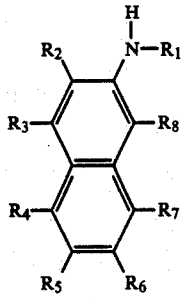

Structure II

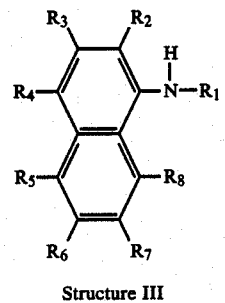

Structure III

= any one of the following: —H, —(CH$_2$)$_n$CH$_3$ (n=0 to 10), —OCH$_3$, —OC$_2$H$_5$ —Cl, —F, —Br, —I, —CN, —SO$_3$H,

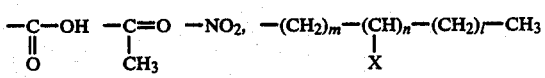

(where m, n, l=0 to 5 and X=any of the above groups).

As used in this disclosure the term color change embodies the spectral change of the light transmitancy through the polymer film. For example, when the polymer is potentiostatically switched to +0.6 V vs Ag-/AgCl reference electrode in 1 M HCl, the color is blue because the green and the red colors are absorbed. Our spectroscopic measurements indicate that polyaniline has absorption bands in the 500 to 800 nm region, therefore green (500 to 570 nm), yellow to orange (570 to 600 nm) and red (600 to 700 nm) lights are absorbed. The blue (450 to 500 nm) light is transmitted to show a blue color.

When the polymer is switched to +0.4 V two absorption bands are observed spectroscopically. One band in the 400 to 460 nm region that absorbs blue. Another in the 580 to 800 nm region that absorbs yellow, orange and red. This leaves the green light in the 490 to 570 nm region which transmits through the panel.

When the polymer is switched to +0.5 V vs Ag-/AgCl, an absorption band appears in the 520 to 700 nm region to absorb green, yellow and red lights. Only the blue light is transmitted to give a blue color.

When the voltage is switched to 0.0 V or −0.1 V the polymer has no absorption band in the visible spectral region, therefore the film is transparent. At +0.7 V both blue and red are transmitted through and therefore the color is purple.

The previously described voltage-color relationship was at pH 0 (1 M HCl). The voltage-color relationship can be altered by changing the acidity of the electrolyte. For example, in a pH 3 electrolyte solution, the same sequence of color changes are found at switching voltages about 0.2 V lower than that found for 1 M HCl solution.

Figure 2:
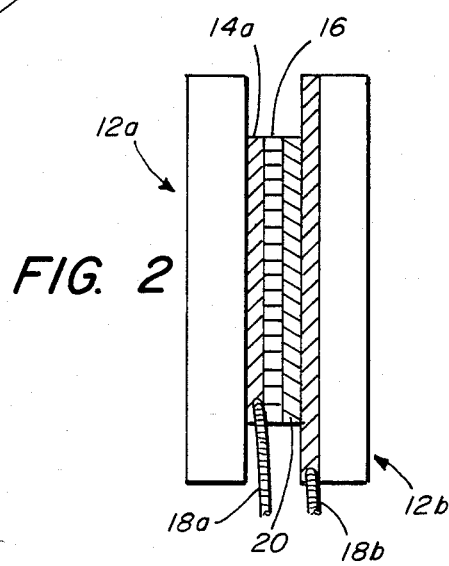
FIG. 2 is a side view of the panel of FIG. 1.

Referring to FIGS. 1 and 2, transparent glass or plastic sheets 12a and 12b are shown and each sheet is coated with a transparent conductive coating 14a (such as tin oxide, indium oxide or thin transparent metal films such as platinum or gold) disposed on their inwardly facing surfaces. The electrode 14a has a thin film of an electrochromic polymer film 16 disposed thereon.

Disposed between the sheets 12a and 12b is a liquid or solid transparent electrolyte 20 such as Nafion® shown in FIG. 2. Positive and negative leads 18a and 18b from the electrodes are connected to a power supply 22. This would be most advantageous when the panel is used in large installations and the like for windows which can be controlled manually and/or automatically in response to changes in the weather. Alternatively, the positive and negative leads may be connected to a photocell controlled power supply so that both the color and the tint can change automatically in response of the light level of the environment.

For tinting of the panels there are two techniques. The first is applying a voltage intermediate that required for a color stage and a transparent stage of a single polymer film. With a voltage of +0.3 V a dark green is observed and it changes to light green at +0.15 V.

The other technique used to control the tint of the color is a multi layered polymer light filter. With combinations of voltages applied to the layers both distinct colors and tints of a color may be transmitted through the panel. For example in a four layer system a dark green color is achieved by aplying a +0.3 V to all four layers. A 50% increase in transmittancy and a lighter green is achieved by switching two of the layers to −0.2 V (transparent). As is apparent, different gray scales can be achieved with the single or multi layered panel.

Figure 3:
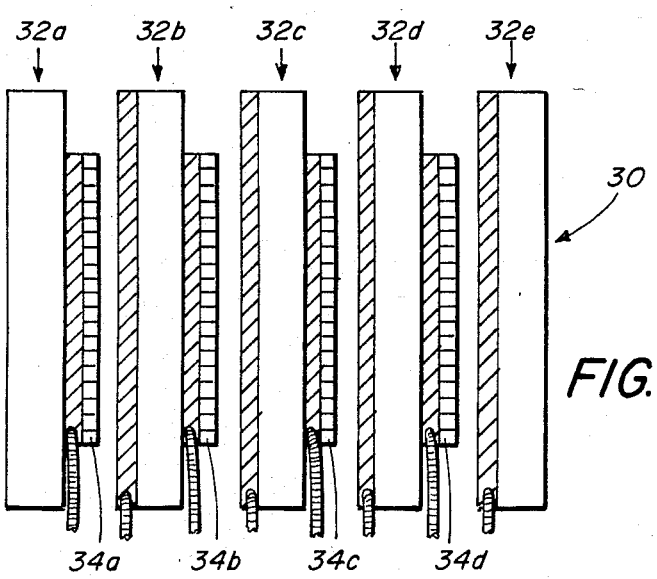
FIG. 3 is a side view of multi polymer layer panel.

In FIG. 3, four layer light filter 30 comprises five transparent plates 32a, 32b, 32c, 32d and 32e each having electrolytes formed on their facing surfaces. The pair of outer plates 32a and 32e are the same as those for the single layer light filter of FIGS. 1 and 2. The added inner plates 32b, 32c and 32d are a glass or plastic, coated with tin oxide or thin metallic transparent conductors. Disposed on one of the electrodes of each pair of facing electrodes is a thin layer (0.01 μm to 0.1 μm) of the electrochromic conducting polymer.

Although four layers have been described, two or more layers may be used in any combination of voltages to allow the transmission of different colors and tints through the panel.

The relative thicknesses of the electrodes, electrolyte and polymer layers of FIGS. 1–3 may vary; illustrative ranges include 0.1 to 1.0 microns for the electrode layers; 0.01 to 0.10 microns for the polymer layer; and 10 microns to one mm for the electrolyte.

The preparation of the electrochromic polymer film, 16, is accomplished by electrochemical polymerization of monomers with structures of I, or II, or III dissolved in acid solution such as 0.1 M HCl using standard techniques. The polymer is coated on the anode during the polymerization process. The control of film thickness is accomplished via monitoring the charge accumulated during electrolysis of aniline at +0.7 V vs. Ag/AgCl.

Alternatively, the electrochemical polymerization can be carried out after an ion-exchanging resin, Nafion ® (a polyfluorinated sulfonate commercially available polymer), is cast on the tin oxide coating prior to electrolysis. This modification is useful for improving chemical stability of the electrochromic polymer coating. The polymerization occurs within the film after the protonated monomer (I, or II, or III) has gone into the Nafion ® film via ion-exchange properties.

After the polymerization/coating process is done, the monomer solution is replaced by an electrolytic solution (not shown). The choice of electrolyte is important to film properties. Because the anions in the electrolyte interact with the polymer cations they can be used to adjust the properties of the polymer for a specific application. For example the trifluoroacetate and trifluoromethane sulfonate are weakly associating to the polymer cation but the chloride anions are more polarizable and interact with the polymer more strongly. Strong organic or inorganic acids and the salts of their conjugated bases are suitable. Especially suitable also are trifluoroacetic acid, sodium trifluoroacetate, hydrochloric acid, potassium chloride and phthalate buffer solutions.

The color of the transparent polymer film can be changed by applying voltage across the interface between the film and the contacting electrolyte. The voltage switchable colors include blue, green, light-yellow, purple, and transparent over a potential range of −0.2 V to +0.6 V vs Ag/AgCl. The response time for color change is short for example a 0.1 second response time is typically observed for this polymer films. Repeated cycling between these potentials is reproducible for continuous test periods of 10 days. Monthly testing of samples for a period of a year also show reproducible performances. From the available data, the color switching properties are expected to be reproducable for more than one (1) million cycles.

It is expected that the polyaniline film will be able to change tints of various colors within the various colors for example it changes from blue to green within 0.2 seconds of time. Within this amount of time, the transmittance in the green region is decreased by 90% and the transmittance in the blue region is increased by 9 fold (from 10% to 90%).

Although described with reference to glass sheets and clear plastic sheets also within the scope of the invention are sheets such as mica, transparent crystaline materials, wax papers and translucent papers. Further, the clear plastic sheets include acrylics (Lucite, Plexiglas), ABS resins, acrylonitrile methyl acrylate copolymers, expoxies, ethylene vinyl acetate, FEP resins, nylons, polybutylenes, polycarbonates (Lexan), polyesters, polyethylenes, flourinated polyethylenes, PFA, polysulfonates, polyvinyl alcohols, polyproplyenes, Tedlar ®, polyvinyl chlorides, polyurethanes and polyimides either alone or in any combination thereof.

Experiments were conducted to demonstrate that polyaniline does have the desired electrochromic properties. The conventional three electrode geometry was utilized. The working electrode was a thin glass plate (1/16th inch thickness) coated with a thin film of tin oxide (surface resistance 25 $\Omega/\square$). A platinum wire counter electrode and a saturated calomel reference electrode were used. The experiments were carried out in a quartz cell, dimensions one centimeter by one centimeter by four centimeters, to which above electrodes were added. The polyaniline medium was prepared separately in acidic electrolyte containing the aniline monomer and then transferred to pure electrolyte (1M trifluoracetic acid) in the quartz cell. Potentials were applied with a Wenking potentiostat Model LB 75 L. The color changes of the polymer were measured with a UV-Visible Spectrometer, Varian Model DMS-90. At 0 volts and −0.1 volts the polymer was transparent. At +0.2 volts the polymer was light yellow. At +0.4 volts the polymer was green. At +0.5 volts the polymer was blue. At +0.6 volts the polymer was blueish purple.

As set forth above with the basic structures and the combinations of the substituent groupings R1-R8; m, n, and l, and X either alone or in combination with various electrolytes the color changes and numbers of distinct colors can be controlled. In experiments to date, color changes of a specific polymer through at least a thousand changes still showed the same sharpness and intensity in the colors produced and further the display device when exposed to oxygen and water (moisture) showed no signs of degradation over a period of at least four months.

Although the invention has been described in reference to color changes in the visible spectra, 400-800 nm; the invention also affects transmittancy in the non-visible spectral region, for example, the infrared and ultraviolet regions of the spectrum.

Having described our invention, what we now claim is:

1. A transparent color panel which comprises:
   first and second transparent electrodes spaced apart in facing relationship;
   a polymer formed from monomeric aniline coated on said second electrode and facing the first electrode; and an electrolyte disposed between the first and second electrodes; the polymer adapted to display at least three distinctive color changes in response to voltages applied to the electrodes which color changes are reproduceable.

2. The panel of claim 1 wherein the electrodes each comprise a transparent sheet having an electrolytic material disposed thereon said electrolytic material on the opposed facing surfaces of said transparent sheets.

3. The panel of claim 1 which includes a plurality of polymer layers formed in said panel each said layer sandwiched between two transparent electrodes adapted to change color in response to a voltage change.

4. The panel of claim 3 wherein said electrodes are transparent.

5. The panels of claims 1 or 3 wherein the electrodes are selected from the group consisting of tin oxide, indium oxide, gold and/or platinum.

6. The panel of claim 1 wherein the electrolyte is selected from the group consisting of trifluoroacetate, trifluoromethane sulfonate, trifluoroacetic acid, sodium trifluoroacetate, hydrochloric acid, potasium chloride and phthalate buffer solutions.

7. The panel of claim 1 wherein the polymer is formed by the polymerization of the monomers selected from the group consisting of:

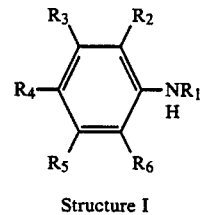

Structure I

-continued

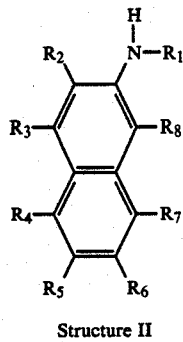

Structure II or

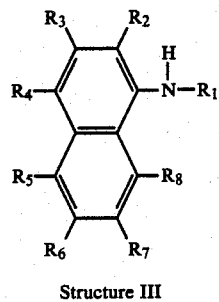

Structure III where $R_1$-$R_8$
= any one of the following groups: —H, —(CH$_2$)$_n$CH$_3$ (n=0 to 10), —OCH$_3$, —OC$_2$H$_5$ —Cl, —F, —Br, —I, —CN, —SO$_3$H,

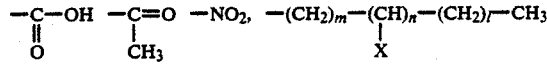

(where m, n, l=0 to 5 and X=any of the above groups) that define $R_1$-$R_8$.

8. The panel of claim 1 wherein the polymer has absorption range between 400 to 800 nm.

9. The panel of claim 1 which includes:
   means to apply voltage changes to said polymer whereby the polymer displays different gray scales.

10. A method for the transmission of color through a panel wherein the panel comprises first and second transparent electrodes and a polymer formed from monomeric analine is coated on one of said electrodes and an electrolyte is disposed between the first and second electrodes which includes;
   applying a voltage to the polymer the polymer changing to a first color;
   applying a second voltage to the polymer the polymer changing to a second color; and
   applying a third voltage to the polymer the polymer changing to a third color.

11. the method of claim 10 wherein the transparent display panel includes a plurality of layers of polymer each layer disposed between opposed electrodes and which includes:
   applying independently voltages to each of said layers to control the color of each of the polymers.

12. The panel of claim 1 wherein the electrolyte is a liquid electrolyte.

13. The panel of claim 1 wherein the electrolyte is a solid electrolyte.

* * * * *